United States Patent [19]

Miner

[11] Patent Number: 4,962,834

[45] Date of Patent: Oct. 16, 1990

[54] THREADED REMOVABLE END MOUNT SYSTEM FOR SHOCK ABSORBERS

[75] Inventor: Lewis B. Miner, 10608 Rookwood Dr., San Diego, Calif. 92131

[73] Assignees: Walter K. Napoleon; Lewis B. Miner, both of San Diego, Calif.

[21] Appl. No.: 366,149

[22] Filed: Jun. 14, 1989

[51] Int. Cl.$^5$ .............................................. F16F 9/00
[52] U.S. Cl. ................................ 188/321.11; 267/221; 267/286; 267/170; 267/179
[58] Field of Search ................. 188/321.11, 322.11, 188/281, 282; 280/668, 666, 667; 267/221, 217, 34, 286, 287, 291, 166, 169, 170–177, 179, 73, 74; 403/300, 305, 306, 308

[56] References Cited

U.S. PATENT DOCUMENTS

| | | | |
|---|---|---|---|
| 1,047,491 | 12/1912 | Bliss | 267/73 |
| 1,189,953 | 7/1916 | Hyne | 188/321.11 |
| 2,509,803 | 5/1950 | Booth | 267/221 X |
| 2,684,238 | 7/1954 | Robinson | 267/73 |
| 2,832,091 | 4/1958 | Noyes | 267/221 X |
| 2,872,209 | 2/1959 | Walker | 267/221 X |
| 2,896,938 | 7/1959 | Walker | 267/221 |
| 3,010,714 | 11/1961 | Stresnak et al. | |
| 3,043,581 | 7/1962 | Schmidt . | |
| 3,096,084 | 7/1963 | Osterhoudt . | |
| 3,160,406 | 12/1964 | Dickinson | 267/221 |
| 3,163,411 | 12/1964 | Heckethorn . | |
| 3,347,541 | 10/1967 | Buccino | 267/34 |
| 3,464,688 | 9/1969 | Papousek . | |
| 3,679,029 | 7/1972 | Thomas | 188/321.11 |
| 3,781,033 | 12/1973 | Buchwald | 267/287 X |
| 3,801,085 | 4/1974 | Sandor | 267/34 X |
| 3,951,391 | 4/1976 | Papousek . | |
| 4,020,929 | 5/1977 | Goldih | 188/321.11 |
| 4,431,092 | 2/1984 | Kloster | 188/321.11 |
| 4,438,908 | 3/1984 | Terada | 188/321.11 X |
| 4,630,803 | 12/1986 | Werner et al. | 188/321.11 X |
| 4,683,993 | 8/1987 | Tanabe et al. | 188/321.11 |

FOREIGN PATENT DOCUMENTS

| | | | |
|---|---|---|---|
| 2320913 | 11/1973 | Fed. Rep. of Germany | 188/321.11 |
| 475629 | 6/1954 | Italy | 267/221 |
| 790647 | 2/1958 | United Kingdom | 188/321.11 |
| 2075630 | 11/1981 | United Kingdom | 188/321.11 |

Primary Examiner—Douglas C. Butler
Attorney, Agent, or Firm—Knobbe, Martens, Olson & Bear

[57] ABSTRACT

An interchangeable end mount system for stabilizer shock absorbers. Two types of end mounts are described, an eye ring end mount and a stud end mount. In one preferred embodiment, the eye ring end mount includes an eye ring, a threaded sleeve with a shoulder, and a washer. The end mount is removably screwed onto a threaded piston rod. An improved spring seat provides a bottom support for the shock absorber spring. A stud end mount embodiment includes an internally and externally threaded stud with a shoulder, and a washer. Another embodiment of the stud end mount does not have a shoulder or washer but uses cup washers and urethane doughnuts to retain the shock absorber spring.

2 Claims, 2 Drawing Sheets

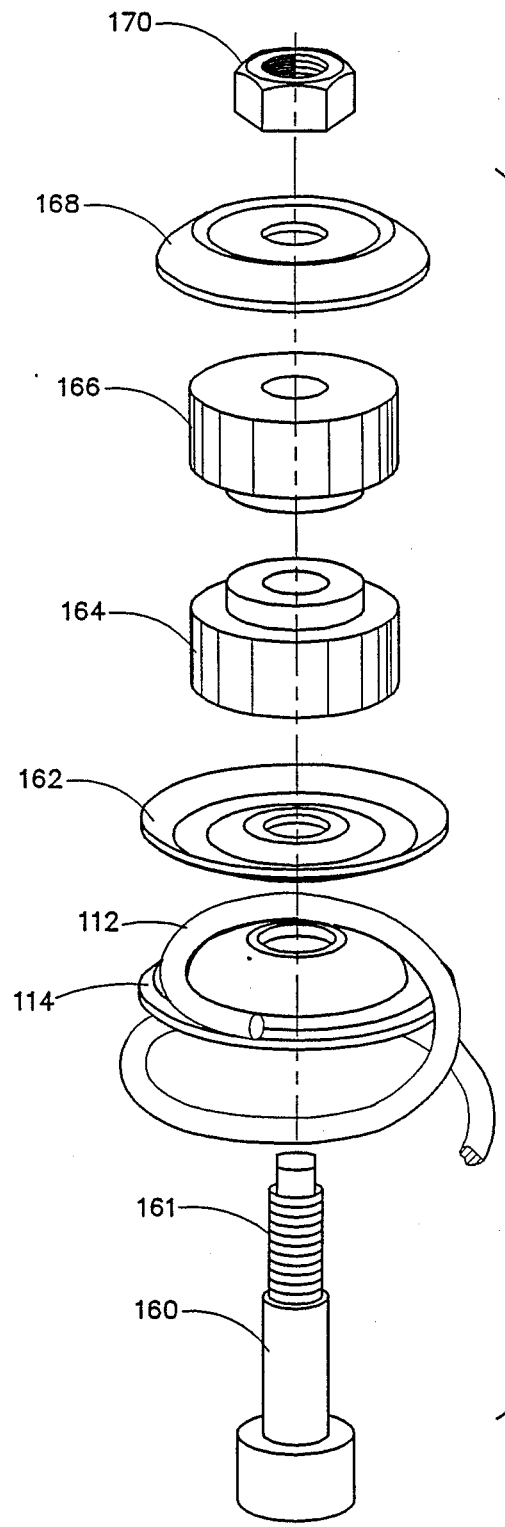
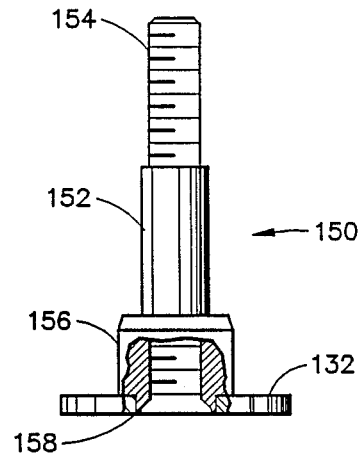
FIG. 5
FIG. 6
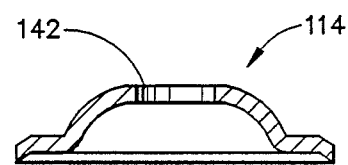
FIG. 4

THREADED REMOVABLE END MOUNT SYSTEM FOR SHOCK ABSORBERS

BACKGROUND OF THE INVENTION

1. Field of the Invention

The present invention generally relates to vehicle stabilization equipment such as shock absorbers and, more particularly, to shock ansorber end mounts.

2. Description of the Prior Art

Market demand for stabilizer shock absorbers is high. The reason for the demand is related to large numbers of sport utility vehicles such as vans, pickups, jeeps and the like, which have experienced a great increase in popularity. Today's younger, more affluent generation includes a large number of people who spend their free time driving in backcountry areas and thus require an all-terrain vehicle. Also included are many people who have children and thus require more passenger and cargo room in their vehicles. Over the years, the size of most passenger cars offered for use on our highways has been considerably reduced, with a corresponding decrease in vehicle carrying capacity and power. These conditions have fostered a demand for a new breed of vehicle: the sport utility vehicle, which is generally characterized as powerful and fun to drive, yet also roomy and practical.

A serious shortcoming of sport utility vehicles, however, is their notoriously stiff ride and lack of stability, especially on rough roads, around corners and during hard braking. One solution to the problem has been to install stabilizing equipment such as heavy-duty shock absorbers which can provide sway-free control and a better overall ride.

Basically, a shock absorber includes a piston rod connected to a piston which reciprocates inside a shock absorber barrel filled with a viscous fluid. A shock absorber dampens the oscillations in the spring connecting the vehicle body to an axle and a wheel. By doing so, the associated tire stays in contact with the road and does not bounce excessively. Sport utility vehicles, however, require heavy-duty shock absorbers to compensate for their added weight and harsher operating environments.

One such heavy-duty shock absorber, the overload shock absorber, has historically been the primary weapon used against harsh ride and poor handling, attributes common to most sport utility vehicles. An overload shock absorber is characterized by a spring simply coiled around the outside of a conventional shock absorber. The spring on the overload shock absorber serves to dampen vehicle oscillations on compression.

However, an overload shock absorber is limited by the fact that only piston compression is relieved by the external spring, that is, the force produced when the vehicle "drops" onto the wheels and axle. Piston tension forces are not relieved by the overload shock absorber because the outer spring is retained as a free-floating spring wherein the shock absorber piston rod and mount, and shock absorber barrel, are not attached to the spring. The overload shock absorber is still in use today; however, it is a comparatively inferior design when compared to the stabilizer shock absorber.

The best heavy-duty shock absorber presently available for sport utility vehicles is the stabilizer type shock absorber. A stabilizer shock absorber is a conventional hydraulic shock absorber with a spring coiled around the outside and connected on one end to the shock absorber piston rod, and on the other end to the shock absorber barrel. Unlike the overload shock absorber, the stabilizer shock absorber also dampens shock absorber oscillations under tension. One example of a stabilizer shock absorber is disclosed in U.S. Pat. No. 3,951,391 to Papousek, which document is hereby incorporated herein by reference.

It is the combination of four stabilizer shock absorbers on a vehicle, undergoing opposing tension and compression, that provides stabilization of roll and pitch. For example, when cornering, centrifugal force causes the weight of a vehicle to be thrown to the side of the vehicle closest to the outside of the curve, resulting in the outside of the vehicle "sinking" and the inside of the vehicle "rising". This effect is known as sway, or roll. Unnecessary roll reduces a driver's ability to maneuver a vehicle around a corner. With stabilizer shocks, a vehicle undergoing cornering will level out, since the shocks located on the outside of the vehicle will "push" the chassis up and the inside shocks will "pull" the chassis down.

As another example of vehicle stabilization, pitch, or nosediving, is induced in a vehicle when a vehicle comes to a sudden stop. Stabilizer shocks counteract this natural tendency by pushing up on the front of the vehicle and pulling down on the rear. Stabilizer shocks can push on compression and pull on extension because one end of the spring is held in place against the piston rod and the other end of the spring is affixed to the shock barrel.

Unfortunately, present producers of stabilizer shock absorbers must custom manufacture each shock depending on the type of end mount required by the conveying vehicle. In particular, upper shock absorber end mounts must be welded onto piston rod ends. End mounts are the means by which a shock absorber is connected to a vehicle. Typically an upper end mount connects the shock to a chassis, and a lower end mount connects the shock to an axle or wheel. During stabilizer shock absorber production, for example, a manufacturer will take off-the-shelf hydraulic shock absorbers without end mounts, install an outer spring and spring collars, as described in the Papousek reference, and weld on either an eye ring end mount or a threaded stud end mount as required by the particular vehicle.

Unfortunately, there are three significant manufacturing problems which have heretofore prevented the production of a standardized stabilizer shock absorber for all of the usual applications. First, the length of the piston rod associated with an eye ring end mount is different from the length of the piston rod used with a threaded stud end mount. Therefore, for each size of shock absorber, two styles of shock absorbers having different piston rod lengths must be stocked. Second, the eye ring type of end mounts of current stabilizer shock absorbers require that a second, upper, spring collar be used. This means that eye ring end mounts are inherently more costly to manufacture than stud end mounts due to the additional spring collar. Third, since an upper spring collar is required for eye ring end mounts, but not for stud end mounts which function in conjunction with a pigtail end spring, every class of pressure rated spring such as, for example, springs rated at 100 lbs./sq. in., require one spring with a pigtailed end (for stud end mounts) and one without (for eye ring end mounts).

Consequently, a need exists for an improved stabilizer shock absorber which is standardized and hence readily adaptable to many different applications resulting in an efficient means of manufacture and a reduction in the number of inventoried parts required for their manufacture.

SUMMARY OF THE INVENTION

The present invention provides interchangeable end mounts for stabilizer shock absorbers designed to satisfy the aforementioned needs. The improved stabilizer shock absorber includes end mounts which are easy to install. Moreover, the number of shock absorbers, spring collars and springs inventoried can be substantially reduced. Further improvements include an eye ring end mount which is inexpensive to manufacture, and a spring seat which is stronger than the present state-of-the-art.

Accordingly, the present invention relates to a stabilizer shock absorber including an interchangeable end mount comprising: a threaded piston rod, a spring seat, and a removable eye ring end mount or a removable stud end mount. A stabilizer shock absorber which uses an interchangeable end mount has a piston rod partly extending within a shock absorber barrel, and partly extending outward from the shock absorber barrel. The distal outward end of the piston rod is externally threaded to receive an end mount. The spring seat has an aperture which slips over the piston rod and rests on a piston rod shoulder at the base of the threaded portion. The stabilizer spring fits over the piston rod and the top of the spring rests on the spring seat. An internally threaded end mount is screwed onto the threaded piston rod, thus securing the spring in place. The eye ring end mount is used to mount the top of the shock absorber on a projecting chassis stud by sliding the ring over the stud and fastening the eye ring end mount to the stud by screwing a hex nut onto the stud. The stud end mount slides into a chassis aperture and is secured to the chassis by screwing a hex nut onto an externally threaded portion of the stud end mount.

In one embodiment of the present invention the eye ring end mount is constructed as follows: (1) one end of an internally threaded metal sleeve is pressed into a washer aperture and, (2) an eye ring is welded onto the opposite end of the sleeve. In another embodiment of the eye ring end mounts, the same manufacturing method is used as the method described; however, a hex nut is machined on the outer surface of the threaded sleeve to allow wrench tightening. In a preferred embodiment of the stud end mount, the stud is fashioned by drilling and tapping one end of a steel rod, machining a shoulder, externally threading the other end of the rod, and pressing a washer onto the internally threaded end. In yet another embodiment of the stud end mount, a stud is manufactured as above but without the machined shoulder and washer. In this embodiment, two cup washers and two urethane doughnuts are used to lock the spring in place. This doughnut arrangement may also be used with the first type of stud mount for spacing.

These and other objects and features of the present invention will become more fully apparent from the following description and appended claims taken in conjunction with the accompanying drawings.

BRIEF DESCRIPTION OF THE DRAWINGS

FIG. 4 is a side elevational view with cutaway of one preferred embodiment of a bell washer spring seat as shown in FIG. 2.

FIG. 5 is a side elevational view with cutaway of one preferred embodiment of a threaded stud type of end mount for use in the present invention.

FIG. 6 is an exploded view of another preferred embodiment of a threaded stud type of end mount for use in the present invention.

DESCRIPTION OF THE PREFERRED EMBODIMENTS

Reference is now made to the drawings wherein like parts are designated with like numerals throughout.

Figure 1:
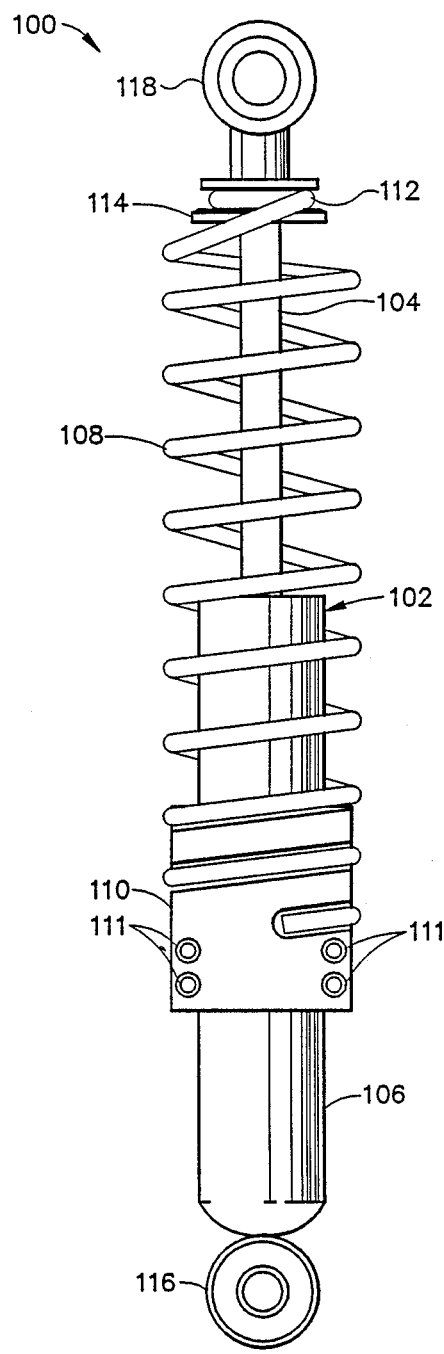
FIG. 1 is an elevational view of one preferred embodiment of the present invention, comprising a stabilizer shock absorber with a removable eye ring type of end mount.

In FIG. 1, a stabilizer shock absorber 100 is shown as an assembly which includes a conventional hydraulic shock absorber 102. The shock absorber 102 has a piston rod 104 connected to a piston (not shown) which reciprocates inside a shock absorber barrel 106 filled with fluid to dampen oscillations on a conveying vehicle (not shown). A spring 108, coiled around the shock absorber barrel 106, is allowed to compress and expand so as to oppose the reciprocating movement of the piston rod 104. The spring 108 is attached at its base to the shock absorber barrel 106 with a spring collar 110. The spring collar 110 is disclosed in more detail in U.S Pat. No. 3,951,391 to Papousek. The spring collar 110 a split, two piece aluminum casting which has an external helical groove into which the spring 108 is inserted. By loosening a set of spring collar screws 111 which hold the two pieces of the spring collar 110 together, the spring collar 110 may be moved up and down on the shock absorber barrel 104 to adjust the tension of the spring 108.

The top end of the spring 108 terminates in a pigtail 112, or conical helix. The pigtail 112 is supported from the bottom by a spring seat 114 placed on the piston rod 104. The spring seat 114 is a washer-like object which prevents the spring 108 from travelling downward on the piston rod 104 during shock absorber extension. The spring seat 114 has an aperture (not shown) which accepts the piston rod 104 up to a point on the piston rod which is larger than the diameter of the aperture in the spring seat 114, where the spring seat 114 is then held in place. Thus, the combination of the pigtail 112, the spring seat 114, and an end mount 118, functions to attach the spring 108 to the piston rod 104. Given a typical spring diameter of about 2", the pigtail 112 is one loop of the spring 108 narrowed to a diameter of about 1".

The stabilizer shock absorber 100 is usually installed in a vehicle to connect the sprung weight of the vehicle, or chassis, with the unsprung weight of the vehicle, or wheels and axles. However, one skilled in the art will understand that shock absorbers, including the present invention, may be used in a variety of other applications requiring a damper such as, for example, in a steering stabilizer application. Using a stabilizer shock absorber as a steering stabilizer, the shock absorber is attached on one end to a tie rod and on the other to a chassis. In this configuration the stabilizer shock absorber functions as a "return to center" device which reduces shimmy and road wander on heavier vehicles.

In the present invention, the eye ring end mount 118 can be installed on the piston rod 104 by screwing a threaded bore in the end mount 118 onto threads on the piston rod 104 and, similarly, removed from the piston rod 104 by unscrewing. The structure of end mount 118, clarifying how it is secured onto the piston rod 104, will be explained in more detail hereinafter with reference to FIGS. 2 and 3.

In its more typical application, the stabilizer shock absorber 100 is installed in a vehicle by placing a lower end mount 116 over a threaded stud on an axle. The lower end mount 116 is secured on the stud with a hex nut (not shown). An upper end mount 118 is used to secure the piston rod 104 to the chassis of the vehicle. The upper end mount 118 shown in FIG. 1, an eye ring end mount, is one of two types of end mounts.

Figure 2:
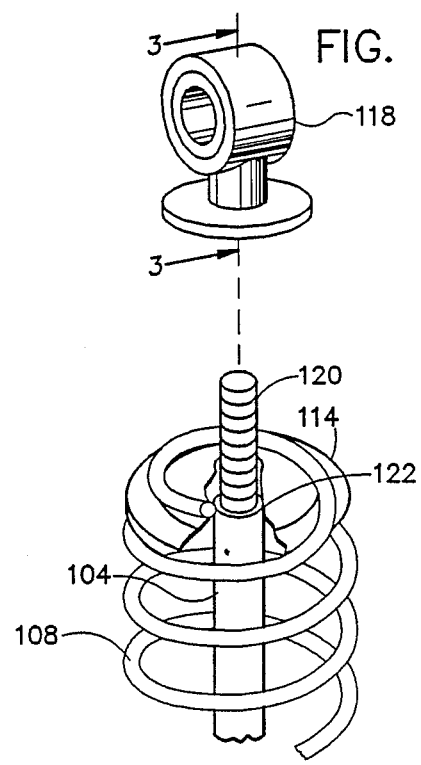
FIG. 2 is an exploded view of a portion of the stabilizer shock absorber of FIG. 1, illustrating an eye ring type of end mount, and portions of a spring seat and threaded piston rod.

Referring now to FIG. 2, it is seen that the eye ring end mount 118 is removably secured to the piston rod 104. In contrast, the eye ring end mount 118 of earlier technology was welded onto the top of the piston rod 104. Additionally, in the earlier welded end mount technology, an upper spring collar (not shown), similar to the lower spring collar 110 shown in FIG. 1, was required to secure the upper end of the spring pigtail 112 to the piston rod 104. The upper spring mount was internally grooved and held in place on the piston rod 104 by a washer on the upper end mount 118 fit into the internal groove. Thus, in the earlier welded end mount technology, an upper spring collar was required, and a spring with a pigtail could not be used, in conjunction with the eye ring end mount. The necessity of an upper spring collar and a spring without a pigtail has been obviated by the removable end mount as illustrated in FIG. 2.

In one preferred embodiment of the present invention, the piston rod 104 is a ½" diameter steel rod with 7/16" diameter external threads. A threaded portion 120 of the piston rod 104 extends for approximately ½" of the length of the piston rod 104 from its top end. Of course, other dimensions for the piston rod 104 and threaded portion 120 may be desirable, depending on the specific application. Prior to installing the spring 108 around the shock absorber 100, the spring seat 114 is placed on the piston rod 104, so as to rest on a piston rod shoulder 122 which is located at the bottom of the threaded portion 120.

A preferred embodiment of the eye ring end mount 118 can be more fully described by reference to FIG. 3. The eye ring end mount 118 includes a threaded sleeve 130 which, for example, is a ½" length of ⅝" diameter steel rod. This steel rod is bored by drilling completely through the rod along its axis. The steel rod is then tapped with a 7/16" internal screw thread. In addition, about 1/16" of one end of the threaded sleeve 130 is machined into a sleeve shoulder 136. The shouldered end of the threaded sleeve 130 is pressed into a ⅝" washer aperture 138 in a 1½" diameter washer 132 until the sleeve shoulder 136 juts out the other side of the washer 132. A punch (not shown) is used to flatten the sleeve shoulder 136 into a flange circumscribing the circumference of the washer aperture 138.

In another embodiment of the eye ring end mount 118, a common hex nut shape is machined on the outside of the threaded sleeve 130 shown in FIG. 2. The hex nut shape allows a wrench to be used to tighten and untighten the eye ring end mount 118 on the threaded portion 120 of the piston rod 104.

Figure 3:
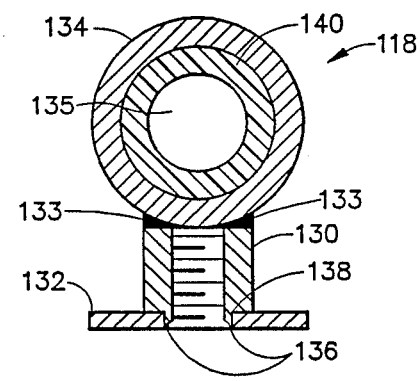
FIG. 3 is a cross-sectional view of the eye ring end mount of the stabilizer shock absorber, taken along line 3—3 of FIG. 2.

In the embodiment of the eye ring end mount 118 shown in FIG. 3, an eye ring 134 is formed by rolling a strip of steel of a size, for example, of ⅞" wide and ⅛" thick, into a ring having an eye ring bore 135 of a size to accept therein a tie rod or chassis projection on a vehicle. By way of example, one preferred embodiment of the eye ring bore 135 is 1⅛" in diameter. The eye ring 134 is then spot welded to the threaded sleeve 130, leaving a metallic residue 133 in a configuration so that the axis of the eye ring bore 135 is perpendicular to the axis of the threaded sleeve 130. A rubber or urethane eye ring bushing 140 with an aperture diameter of ⅝" is then press fit into the eye ring 134. One skilled in the present technology will recognize that the manufacture of the eye ring 134 and eye ring bushing 140 is a well known process in the industry.

For cosmetic purposes, the end mount 118 can be anodized. For example, a zinc coating can be added to create a gold metallic finish. In addition, a rubber dust boot (not shown) may optionally be placed over the piston rod 104 to prevent dirt and dust from interfering with the travel of the piston rod 104 inside the shock absorber barrel 106.

One preferred embodiment of a spring seat 114 can be described by reference to FIG. 4. The spring seat 114 is a metal bell washer having, for example, a 1¾" diameter and an aperture 142 diameter of approximately ½". The elevation height of the preferred spring seat 114 is approximately ¼". The spring seat aperture 142 is dimensioned to allow the threaded portion 120 on the piston rod 104 to fit through the spring seat 114, but it is also manufactured so as to cause the spring seat 114 to remain snug on the piston rod shoulder 122 just below the threaded portion 120. The pigtail 112 of the spring 108 rests on the top of the bell-shaped spring seat 114.

Because of the minimal support for the spring seat 114 provided by the piston rod shoulder 122, the spring seat 114 of the present invention must be sturdier than the spring seats of the prior art. To manufacture the present spring seat 114, a conventional stamping tool (not shown) punches the spring seat 114 from a flat sheet of metal, 2/16" thick, for example, in the preferred embodiment. The stamping tool forms the spring seat 114 in a two-step process of (1) cutting followed by (2) shaping. However, since the order of the stamping steps is not critical, this order may be reversed if desired. Due to the placement of the spring seat 114 on the piston rod shoulder 122 the spring seat 114 must be manufactured with finer tolerances than spring seats used in other, conventional, stabilizer shock absorbers. For example, the diameter and tolerance of the spring seat aperture 142 is preferably 0.442"±0.002". Of course, other spring seat aperture diameters and tolerances may be acceptable depending on the application.

FIG. 5 shows a preferred embodiment of a first type of stud end mount 150. Stud end mounts are the other type of end mounts which are most often used on stabilizer shock absorbers. Instead of an eye ring 134, the stud end mount 150 makes use of a threaded stud 152. The threaded stud 152 is a chassis attaching means which is inserted into a chassis aperture and secured by screwing a hex nut (not shown) onto an upper stud portion 154. The threaded stud is preferably manufactured by use of a screw machine, or automatic lathe (not shown). In one preferred embodiment, for example, an approximately 3" length of ⅝" diameter metal rod has about 1" of the upper stud portion 154 externally screw threaded. A lower stud portion 156 is bored out by drilling about ½", and the stud 152 is tapped with a 7/16" internal screw thread. In addition, a stud shoulder 158 of about 1/16" length is machined into the drilled lower stud portion 156. The threaded stud 152 is then press fit and punched onto the washer 132 as was described above for the manufacture of the eye ring end mount 118. If desired, the stud end mount 150 may also be anodized with a metal, such as zinc. The washer 132 of the stud end mount 150 fits against the pigtail 112 (FIG. 1) of spring 108 after installation, holding the spring 108 in place in the same manner as was described above for the eye ring end mount 118.

Referring now to FIG. 6, a second stud end mount 160 is illustrated, with a threaded portion 161. In this embodiment, a steel rod is machined as in the embodiment shown in FIG. 5, but the stud end mount 160 of FIG. 6 does not have a stud shoulder 158 or washer 132. Instead, the spring pigtail 112 is held in place with the spring seat 114 and a spacer means such as a first cup washer 162, a first doughnut 164, a second doughnut 166, a second cup washer 168 and a hex nut 170 which screws on and off of the threaded portion 161. The cup washers 162, 168, in one preferred embodiment, are metallic and are 1½" in diameter. The doughnuts are preferably either urethane or rubber and are 1¼" in diameter. This doughnut arrangement may also be used with the stud end mount 150 of FIG. 5 for spacing.

As can now be readily understood from this detailed description and the drawings, the present invention comprises a standardized stabilizer shock absorber upon which an eye ring end mount or stud end mount can be interchangeably secured. As a result, the inventory of shock absorbers are nearly halved, the number of spring collars inventoried is drastically reduced, and only one type of spring, that terminating in a pigtail, needs to be stocked. Overall, then, the present invention provides a manufacturer with reduced manufacturing costs of stabilizer shock absorbers, due to smaller inventories, and this reduced cost may be passed onto the consumer in the form of lower prices.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. An interchangeable stud end mount for stabilizer shock absorbers having a piston rod which reciprocates inside a shock absorber barrel and wherein said piston rod and said barrel are additionally connected by a helical coil tension spring, comprising:
   a stabilizer shock absorber having a piston rod which includes an externally threaded surface portion adjacent to a distal end which is located external to said shock absorber barrel;
   a stud mount having an internally threaded bore which is threadably secured onto said threaded portion of said piston rod, wherein said stud mount comprises:
      a washer with a central aperture; and
      a stud having a first end externally threaded and a second end with said internally threaded bore, positioned with said second end circumference substantially concentric to said washer aperture and affixed thereto, said second end having an external circumference greater than said first end; and
   a spring seat having a central aperture to engage said threaded portion of said piston rod and supported on said piston rod by a portion of said piston rod of greater diameter than said spring seat aperture so as to cooperate with said stud mount to retain an end of said spring and prevent said spring from travelling away from the direction of piston rod movement during shock absorber extension.

2. An interchangeable stud end mount for stabilizer shock absorbers having a piston rod which reciprocates inside a shock absorber barrel and wherein said piston rod and said barrel are additionally connected by a helical coil tension spring, comprising:
   a stabilizer shock absorber having a piston rod which includes an externally threaded surface portion adjacent to a distal end which is located external to said shock absorber barrel;
   an eye ring mount having an internally threaded bore which is threadably secured onto said threaded portion of said piston rod, wherein said eye ring mount comprises:
      a washer having a central aperture;
      an eye ring having a bore with an axis substantially perpendicular to an axis of said washer aperture; and
      means for connecting said eye ring to said washer wherein said connecting means includes said internally threaded bore and wherein an axis of said internally threaded bore is substantially collinear with said washer aperture axis; and
   a spring seat having a central aperture to engage said threaded portion of said piston rod and supported on said piston rod by a portion of said piston rod of greater diameter than said spring seat aperture so as to cooperate with said stud mount to retain an end of said spring and prevent said spring from travelling away from the direction of piston rod movement during shock absorber extension.

* * * * *